(12) United States Patent
Bronk et al.

(10) Patent No.: US 12,547,706 B2
(45) Date of Patent: Feb. 10, 2026

(54) PLATFORM HEALTH VERIFICATION

(71) Applicant: Intel Corporation, Santa Clara, CA (US)

(72) Inventors: Mateusz Bronk, Gdansk (PL); Arkadiusz Berent, Pomorskie (PL); Piotr Zmijewski, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 616 days.

(21) Appl. No.: 17/551,690

(22) Filed: Dec. 15, 2021

(65) Prior Publication Data

US 2022/0108008 A1    Apr. 7, 2022

(51) Int. Cl.
*G06F 21/55* (2013.01)
*H04L 9/40* (2022.01)

(52) U.S. Cl.
CPC .......... *G06F 21/552* (2013.01); *H04L 63/20* (2013.01); *G06F 2221/034* (2013.01)

(58) Field of Classification Search
CPC ... G06F 21/552; G06F 2221/034; H04L 63/20
See application file for complete search history.

(56) References Cited

U.S. PATENT DOCUMENTS

| | | | |
|---|---|---|---|
| 2008/0046752 A1* | 2/2008 | Berger | H04L 9/3271 713/186 |
| 2013/0263262 A1* | 10/2013 | Forristal | G06F 21/577 726/22 |
| 2014/0173689 A1* | 6/2014 | Klustaitis | G06F 21/74 726/2 |
| 2017/0353308 A1* | 12/2017 | Reitsma | H04L 63/20 |
| 2022/0070178 A1* | 3/2022 | Lee | H04L 63/0876 |

* cited by examiner

*Primary Examiner* — Ayoub Alata
(74) *Attorney, Agent, or Firm* — JAFFERY WATSON HAMILTON & DESANCTIS LLP

(57) ABSTRACT

A method comprises issuing a challenge to a target computing device, receiving, from the target computing device, a response to the challenge, the response comprising a self-attestation proof, a root of trust (RoT) certificate, and a set of current attestation measurements, and generating a signal indicative of a security status of the target based upon a determination of whether the set of current attestation measurements match a set of expected attestation measurements for the target computing device.

9 Claims, 10 Drawing Sheets

PLATFORM HEALTH VERIFICATION

BACKGROUND

The term "attestation" refers generally to a process in which a processing device, typically a secured device such as a trusted execution environment (TEE), confirms that the hardware and/or software of a computing device is authentic and has not been compromised by the introduction of malicious devices or software. Broadly, the attestation process involves collecting a set of measurements from various components of a device in a trusted environment (e.g., during the manufacturing process), computing a mathematical function (e.g., a hash) of the measurements, and storing the result in a secure memory. Subsequently, the process may be repeated, and the results compared to the original results to confirm that malicious hardware and/or software have not been introduced into the device.

Computing devices such as a remote device management console (MDM) can readily assess the health of a remote device using a plethora of existing protocols. These protocols are typically anchored in a device's root of trust, require a form of interactive protocol (e.g., for anti-replay) and computing/validating some sort of mathematical proof (hash, signature, etc.). Due to the complexity of the mathematical operations involved, humans are poorly suited to conduct attestation operations. This creates an opportunity for security issues in various situations, e.g., using a public computing terminal or using a private computing device that has been left unattended.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
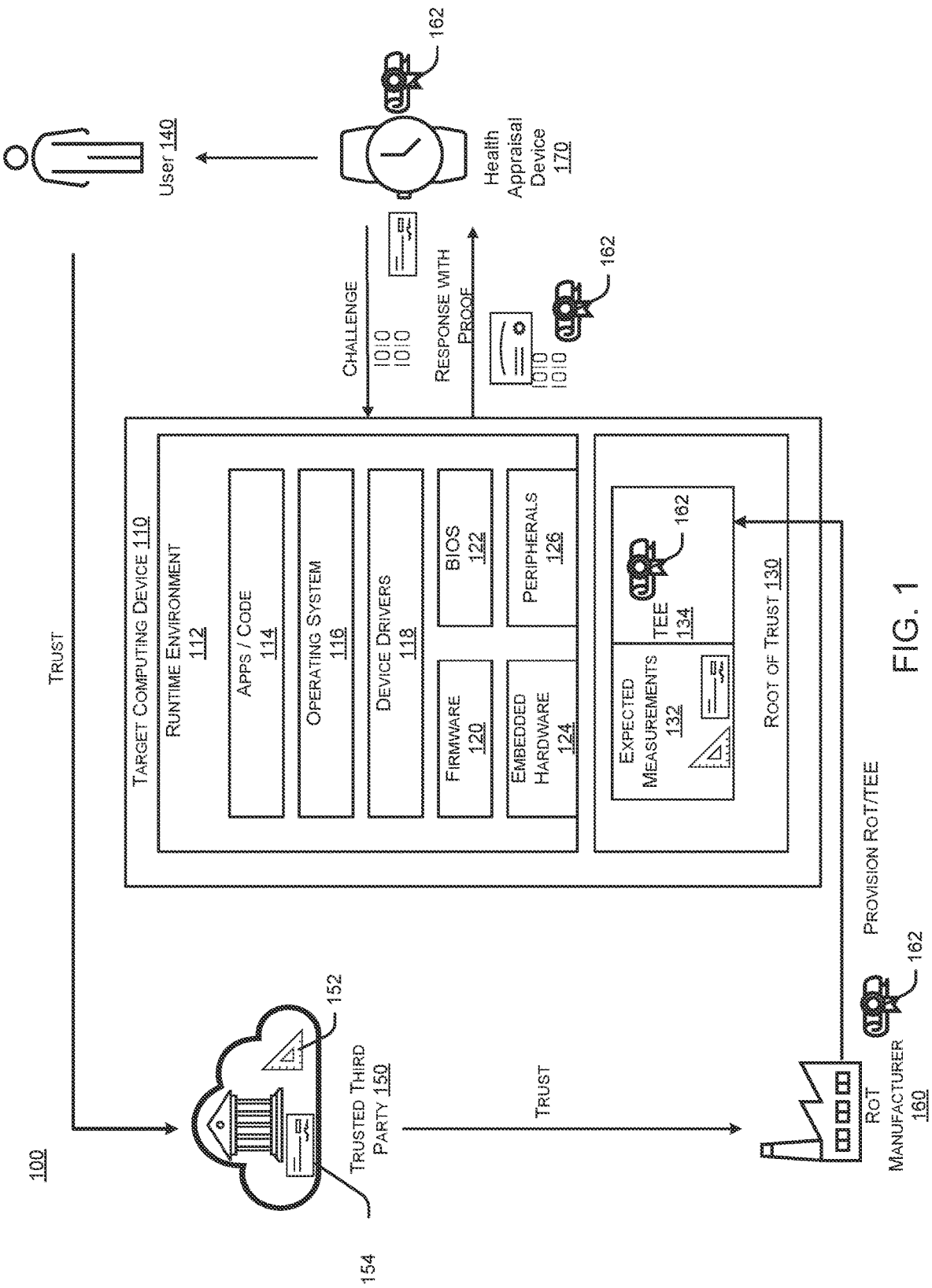
FIG. 1 is a simplified schematic diagram of an example environment in which platform health verification may be implemented in accordance with an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described above, due to the complexity of the mathematical operations involved, humans are poorly suited to conduct attestation operations. This creates an opportunity for security issues in various situations, e.g., using a public computing terminal or using a private computing device that has been left unattended. In both those cases (and others), even though the device appears to be legitimate, and may have an attestable RoT engine, given that all the user is seeing is a display, which can be spoofed, there is a risk of entering sensitive credentials into a hostile device, thus compromising the credentials. While solutions like multi-factor authentication are meant to prevent subsequent account attack, they do not address all use cases (e.g., local assets such as a disk encryption passphrase). In addition, this results in the loss of the first authentication factor.

To address these and other issues, described herein are systems and techniques that enable a user to obtain the health state of a system, before interacting with the system, thereby enabling a user to avoid entering sensitive information into an interface of a device that is not healthy (i.e., secure). Techniques described herein enable the security appraisal of a target device to take place offline, which enables it to be used also in isolated environments (e.g., datacenters), and without reliance on any third party cloud infrastructure. Aspects of a first embodiment will be described with reference to FIG. 1 through FIG. 3. Aspects of a second embodiment will be described with reference to FIG. 4 through FIG. 6.

FIG. 1 is a simplified schematic diagram of an example environment 100 in which platform health verification may be implemented in accordance with an embodiment. Referring to FIG. 1, in some examples, environment 100 comprises a target computing device 110, a trusted third party 150, a root of trust (RoT) manufacturer (typically an OEM) 160, and a health appraisal device 170.

In some examples the target computing device 110 may be implemented as a terminal that is accessible to the public. Examples of such target computing devices may include computers in public locations such as hotels, libraries, hospitals, universities, businesses, and the like. Further examples may include special-purpose computing devices commonly implemented as kiosks such as automatic teller machines (ATMs), airport reservation kiosks, displays, schedule boards, newsstands, public bulletins, and the like.

In some examples target computing device 110 may comprise a runtime environment 112, in which one or more applications and/or code 114 are executing on the target computing device 110. Runtime environment 112 further comprises an operating system 116, device drivers 118, firmware 120, a basic input/output system (BIOS) 122, embedded hardware 124 and may comprise one or more peripheral devices 126. Target computing device 110 further comprises a root of trust engine 130 which may comprise a set of expected measurements 132 and may comprise an operator's certificate, and a trusted execution engine (TEE) 134. A more detailed description of an example of a target computing device is provided below with reference to FIG. 8.

The root of trust manufacturer 160 is the entity that manufactures the device(s) that provide a root of trust 130 for the target computing device 110. In some examples the root of trust manufacturer 160 may be an original equipment manufacturer (OEM) that manufactures the trusted execution engine 134, which may be a component of a larger processor such as a central processing unit (CPU). In some examples the root of trust manufacturer 160 provisions the trusted execution engine 134 with a root of trust certificate 162.

The trusted third party 150 is the entity that owns, operates, or deploys the target computing device 110, or is otherwise able to vouch for what the healthy measurements of the target computing device are (e.g., an IT department, a regulator, a state-level entity, an ISV . . . . The trusted third party 150 maintains a record of the expected measurements 152 of the target computing device 110 when the target computing device is in a secure (i.e., healthy) state and is responsible to issue an authenticated and integrity-protected proof of the expected measurements values (a certificate, Reference Integrity Manifest (RIM), and the like). In some examples the trusted third party 150 may be a facilities operator such as a hotel that operates a business computing center, a bank that operates an ATM network, an airline that operates ticket kiosks, or the like. In other examples the trusted third party may be a contracting organization that manages computing devices such as the target computing device 110.

The health appraisal device 170 may be a personal computing device that belongs to a user 140 and may be embodied, for example, as a smart watch, a mobile phone, a tablet device, a laptop computer, or the like that includes a general-purpose processing device which may implement instructions to perform security operations. In other examples the health appraisal device may be implemented as a special-purpose device which may be embodied, for example, as a universal serial bus (USB) stick, a bracelet, a fob, or the like which includes special-purpose circuitry to implement security operations and a basic output device (e.g., a light emitting diode (LED)) to output a signal indicative of the security status of target computing device 110. The health appraisal device 170 is provisioned with a trusted identity of the trusted third party 150, e.g., the certificate 154. In some examples the root of trust certificate 162 may be embedded in the appraisal device 170. In some examples a manufacturer (e.g., an OEM) may make a Root of Trust (RoT) certificate publicly available, for example, by providing a certificate of authenticity of a trusted platform module (TPM), which is rooted in a known manufacturer identity, which in turn may be pre-provisioned or into the device 170 or otherwise known to it. Provided the target device can produce a certificate that terminates in this known manufacturer ID and can prove it actually owns the associated private key (e.g. by signing the attestation proof with it), an appraisal device can infer the RoT is valid. In other examples. the RoT manufacturer may provide a trusted execution environment (TEE) attestation service. In this case, the certificate 162 may be embodied as a live proof, and the appraiser 170 trusts the service, rather the static identity. In another example the device 110 may self-attest with the manufacturer 160 or a third-party RoT attestation service, then establishes a long-term secret with the certification 162. In other examples the contents of the root of trust certificate 162 may be embedded into the expected measurement 152.

Figure 2:
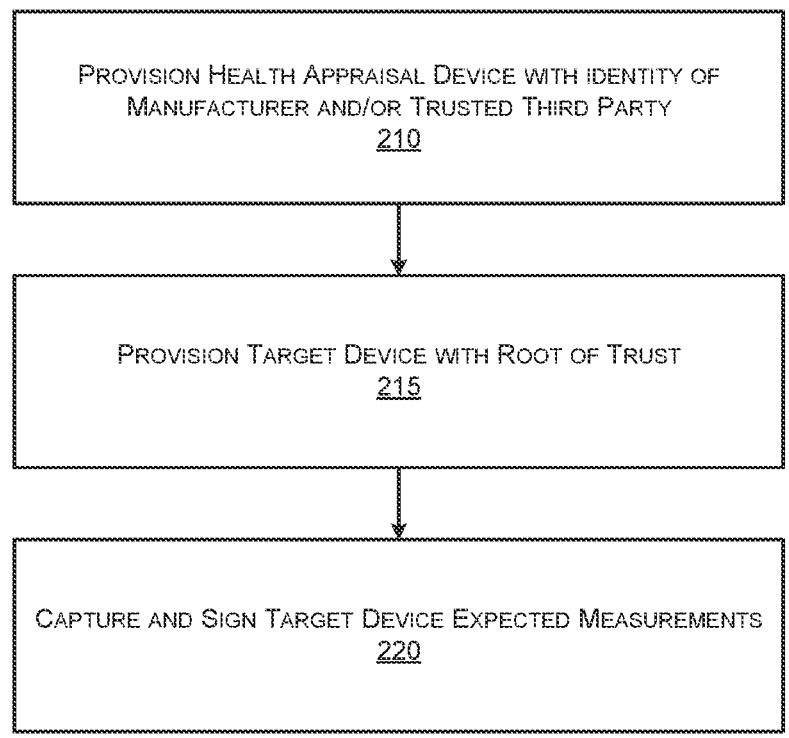
FIG. 2 is a simplified flow diagram of at least one embodiment of a method for platform health verification according to an embodiment.

Having described various components of the environment 100, operations implemented in the environment 100 to perform platform health verification will be described with reference to FIG. 2 and FIG. 3. FIG. 2 is a simplified flow diagram of at least one embodiment of a method 200 for platform health verification according to an embodiment. Referring to FIG. 2, at operation 210 the health appraisal device 170 is provisioned with the identity of the root of trust manufacturer 160 and the trusted third party 150. In some examples the health appraisal device 170 may be provisioned during the manufacturing process. In other examples the health appraisal device 170 may be provisioned in response to a request from the user 140 or during an update process for the health appraisal device 170. In further examples, a user may provision the health appraisal device. For example, a user may have an existing relationship of trust with a device at a first point in time, but may need to relinquish control of the device for a period of time (e.g., for an airport security check). In this case, before relinquishing the device, the user may take a snapshot of the device 110 (i.e., its current measurements) into the appraisal device (170) and/or the target device as 132. When the user retrieves the device, the appraisal device is able to attest the device 110 has not diverged excessively from its last-known security state.

At operation 215 the target computing device 110 is provisioned with a root of trust. As described above, the target computing device 110 may be provisioned during the manufacturing process by the root of trust manufacturer 160.

At operation 220, the actual measurements of the target computing device are captured as a golden reference 152 and signed with a cryptographic signature (154) of the trusted third party, thus producing the expected measurements. In some examples, the signed and certified expected measurements 132 may then be provisioned back into the target device 110 (as depicted on FIG. 1) so that they can be referenced by the appraisal device 170 during an offline attestation process. For example, the expected measurements 152 may be captured when the target computing device 110 is first deployed for public access.

Thus, the operations of FIG. 2 provision the target computing device 110 and the health appraisal device 170 with the necessary information to enable the health appraisal device 170 to assess the security status of the target computing device 110. FIG. 3 is a simplified flow diagram of at least one embodiment of a method 300 for platform health verification according to an embodiment. In some examples the operations depicted in FIG. 3 are performed by the health appraisal device 170, either by software or firmware that executes on a general-purpose processor or by dedicated processing circuitry.

Figure 3:
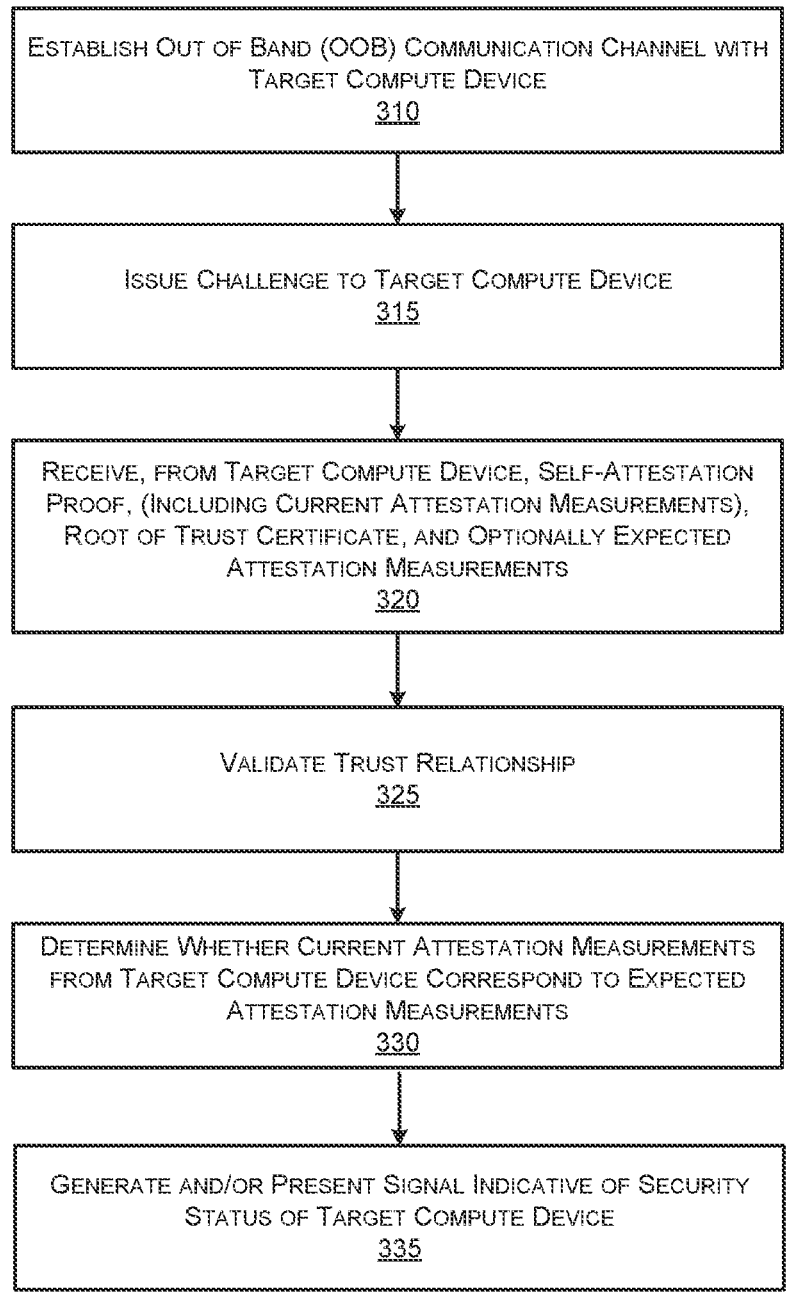
FIG. 3 is a simplified flow diagram of at least one embodiment of a method for platform health verification according to an embodiment.

Referring to FIG. 3, at operation 310 an out-of-band (OOB) communication channel between the health appraisal device 170 and the target computing device 110 is established. In some examples the out-of-band communication channel may be implemented via a wireless communication protocol, e.g., a Bluetooth connection or a near-field communication (NFC) connection. In other examples the out-of-band communication channel may be implemented by a wired connection. For example, a USB stick may implement a communication channel with the target computing device 110 when inserted into a USB port of the target computing device 110.

At operation 315 the health appraisal device 170 issues a challenge to the target computing device 110. In some examples the challenge may comprise a handshake protocol and a request for a concrete type of attestation, identity of the appraiser etc., or simply a random nonce for replay protection. In response to the challenge, the target computing device 110 may compute and generate a response to the health appraisal device 170 that comprises the self-attestation proof, the root of trust certificate, and may also include a set of trusted expected attestation measurements 132 which have been pre-provisioned by the trusted third party 150. The self-attestation proof may include a set of current attestation measurements, certified by the Root of Trust 130 and cryptographically linked to the challenge (for example, via a signature)

At operation 320 the health appraisal device 170 receives the response comprising the self-attestation proof (including current attestation measurements), the root of trust certificate, and, optionally, a set of expected attestation measurements, and at operation 325 the health appraisal device 170 validates the trust relationship. The process may involve integrity and trustworthiness assertions as to the identity of the RoT 130 and the expected measurements 132, e.g., by checking corresponding signatures/certificates, doing a commonly practiced x.509 certificate chain validation, revocation checking and the like.

At operation 330 the health appraisal device 170 determines whether the current attestation measurements received from the target computing device 110 in operation 320 match the expected attestation measurements for the target computing device 100 obtained in operation 220. In some examples the health appraisal device 170 may directly compare the expected attestation measurements to the current attestation measurements. In other examples the health appraisal device 170 may compare a hash of the expected attestation measurements to a hash of the current attestation measurements. In further examples the appraisal may be protocol-specific, for example a TPM quote-based attestation and comparison of the quoted actual measurements (PCR) to the "golden" reference integrity measurements captured by expected measurements 132, a rule-based comparison (e.g., the "expected" measurements being a set of criteria/filters, not actual value to compare to). Alternatively, or in addition, artificial intelligence and/or machine learning (AI/ML) techniques for pattern matching. If the current attestation measurements received from the target computing device 110 in operation 320 match the expected attestation measurements for the target computing device 100 obtained in operation 220 then the device may be considered secure (i.e., healthy). By contrast, if the current attestation measurements received from the target computing device 110 in operation 320 do not match the expected attestation measurements for the target computing device 100 obtained in operation 220 then the target computing device 110 may be considered not secure (i.e., not healthy). In some examples, the health appraisal device 170 may also check the trustworthiness of the expected measurements 132 and root of trust certificate 162 for revocation, for example by querying the trusted third party 150 and/or the RoT Manufacturer 160 for a latest revocation list, querying a live OCSP responder and the like. In addition to performing such a check, the appraisal device 170 may further incorporate the latest version of the revocation lists into the target device's root of trust 130 (similarly to how expected measurements are incorporated). In such case, provided the expected measurements and latest revocation list data are persisted with integrity guarantees and replay-protection (for example, by using anti-rollback security version number: SVN), it allows other (offline) appraisal devices 170, to take advantage of the updated revocation data which the previous protocol completion has persisted.

At operation 335 the health appraisal device 170 generates and/or presents a signal indicative of the security status of the target computing device 110. In some examples the signal may comprise a visual indicator which may be presented on a display of the health appraisal device 170. In other examples the signal may comprise an audible indicator that may be presented on a speaker of the health appraisal device. In other examples the signal may comprise a tactile indicator, e.g., a vibration pattern or the like.

The user 140 may take appropriate action based on the contents of the signal generated in operation 335. For example, if the signal indicates that the target computing device 110 is secure (i.e., healthy) then the user may input login credentials and/or devices (e.g., a credit card) into the target computing device 110. By contrast, if the signal indicates that the target computing device 110 is not secure (i.e., unhealthy) then the user may refrain from inputting login credentials and/or devices (e.g., a credit card) into the target computing device 110.

In some examples the health appraisal device 170 may take additional actions. For example the health appraisal device may transmit the security status of the target computing device 110 to the trusted third party 150, which may take appropriate action such as decommissioning the target computing device 110. Alternatively, or in addition, the health appraisal device 170 may store the security status of the target computing device 170 in a computer readable memory of the health appraisal device to use at a later time. Alternatively, or in addition, the device 170 may unlock some data and share with the target device etc. Further examples may include, for example, a physical security token, which is required for log-in, but only allows itself to be used if plugged into a "healthy" device, a self-defending USB flash drive which does not allow the host system to write anything on it until the host system proves to be healthy.

In another embodiment the target computing device 110 may provide a visually apparent and offline-verifiable attestation proof of platform security (i.e., health) that can be presented for consumption by an end-user, e.g., by an image capture device. In some examples the attestation proof may be implemented as a visual glyph, QR code, or a signal that is transmissible to a remote device. The attestation proof carries cryptographic proof that the target computing device 110 has performed a self-verification. In some examples procedures may be included to guard against replay protections. If the glyph is simply displayed and read (without any interaction with the device), an attacked target computing device 110 could still display the glyph when it is no longer healthy. Under a threat model in which an attacker can manipulate the display, replay protection may comprise a proof of liveness. For example, the health appraisal device or site (150) could generate a one-time numerical code which the user needs to enter into the target device 110, only upon which the code-specific proof (480) is displayed.

Figure 4:
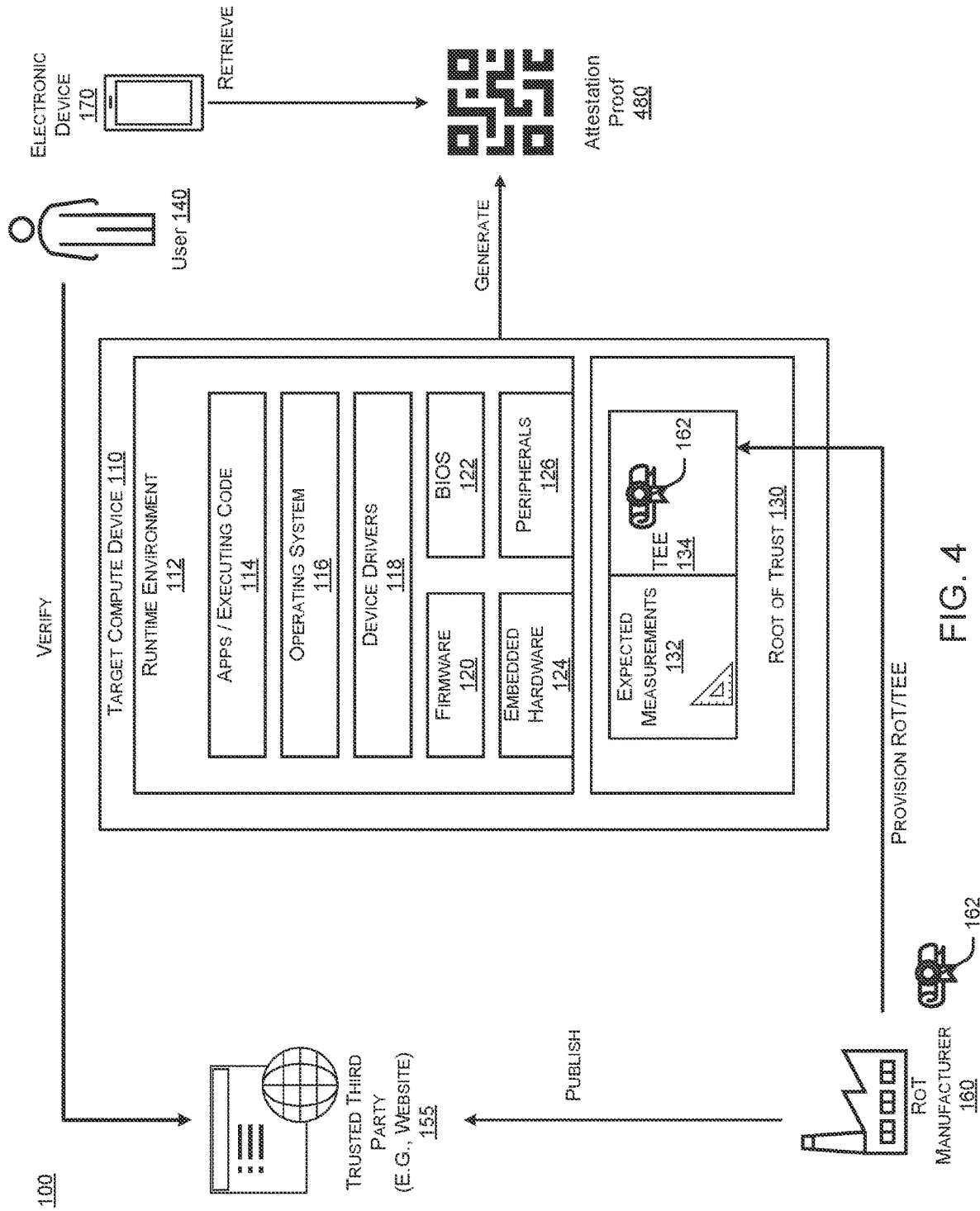
FIG. 4 is a simplified schematic diagram of an example environment in which platform health verification may be implemented in accordance with an embodiment.

FIG. 4 is a simplified schematic diagram of an example environment in which platform health verification may be implemented in accordance with an embodiment. Many of the components depicted in FIG. 4 correspond to the components depicted in FIG. 1. In the interest of brevity, a description of those components will not be repeated. Referring to FIG. 4, the target compute device 110 may be implemented substantially as described with reference to FIG. 1. The trusted third party may be implemented as an optional website 155 that is capable to verify platform trust.

Figure 5A:
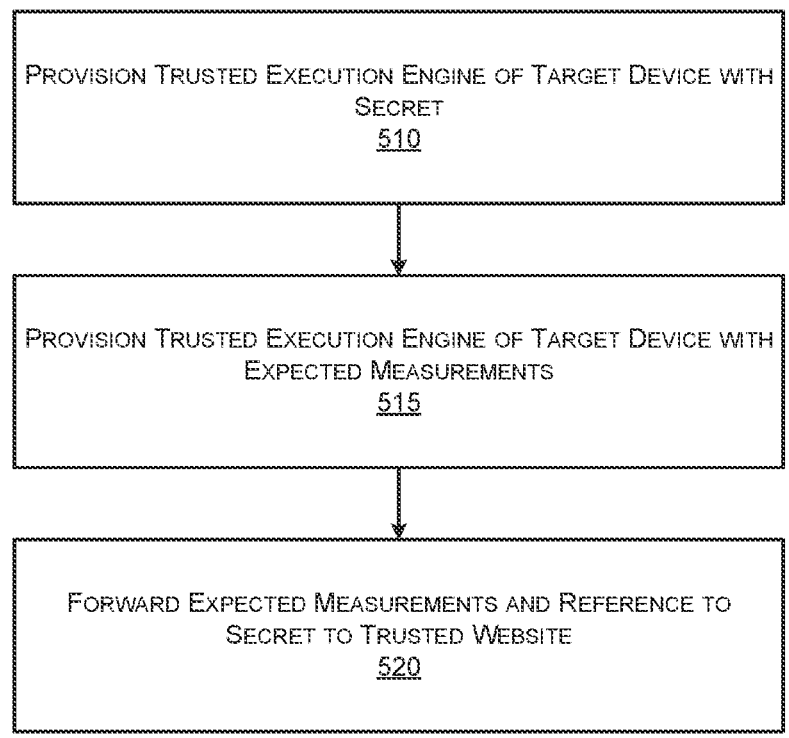
FIG. 5A is a simplified flow diagram of a method for platform health verification according to an embodiment.

The provisioning process for the embodiment of FIG. 4 is similar to the provisioning process described with reference to FIG. 2. FIG. 5A is a simplified flow diagram of at least one embodiment of a method 500 for platform health verification according to an embodiment. Referring to FIG. 5A, at operation 515 the trusted execution environment (TEE) 134 is provisioned with a secret from the root of trust manufacturer 160 and at operation 515 the trusted execution engine 134 is provisioned with the expected measurements for target computing device 110. In some examples the trusted execution environment 134 may be provisioned during the manufacturing process.

At operation 520 the expected measurements and a reference to the secret that was provisioned in the trusted execution environment 134 are forwarded to a trusted third party, which in some examples may be implemented as a website 155. In some examples the manufacturer 160 of the device may be registered with a trusted third party that provides a website 155 for verifying platform trust. In such examples the website 155 may store the expected measurements and a reference to the secret that was provisioned in the trusted execution environment 134 so it can be validated remotely. If the secret is universally trusted (e.g., an on-die certificate authority root certificate), or if only offline attestation is desired, this step may be omitted.

Figure 6:
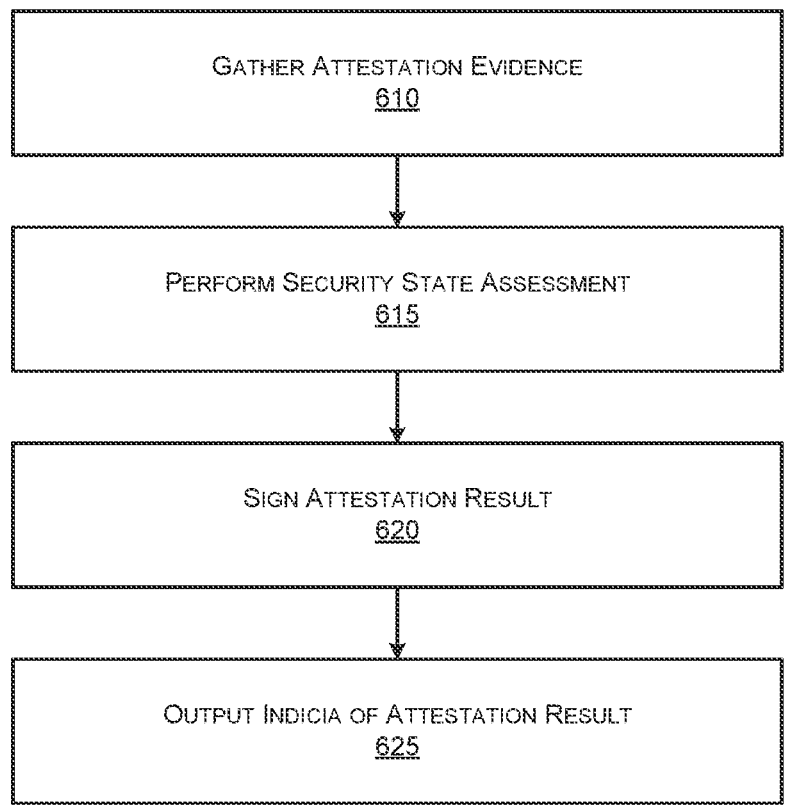
FIG. 6 is a simplified flow diagram of at least one embodiment of a method for platform health verification according to an embodiment.

Thus, the operations of FIG. 5A provision the target computing device 110 with the necessary information to enable the target computing device to perform a self-assessment of its security status. FIG. 6 is a simplified flow diagram of at least one embodiment of a method 600 for platform health verification according to an embodiment. In some examples the operations depicted in FIG. 6 are performed by the target computing device 110, either by software or firmware that executes on a general-purpose processor or by dedicated processing circuitry At operation 610 the attestation evidence is gathered from the current hardware and/or software components executing in the runtime environment. At operation 615 a security state assessment is performed. In some examples the trusted execution environment 134 determines whether the current attestation measurements of target computing device 110 match the expected attestation measurements for the target computing device 100 obtained in operation 515. In some examples the trusted execution environment 134 may directly compare the expected attestation measurements to the current attestation measurements. In other examples the trusted execution environment 134 may compare a hash of the expected attestation measurements to a hash of the current attestation measurements. If the current attestation measurements for the target computing device 110 match the expected attestation measurements for the target computing device 100 obtained in operation 515 then the device may considered secure (i.e., healthy)—including a case where the device (and its trusted execution environment 134) considers itself to be in the secure state. By contrast, if the current attestation measurements for the target computing device 110 do not match the expected attestation measurements for the target computing device 100 obtained in operation 515 then the target computing device 110 may be considered not secure (i.e., not healthy).

At operation 620 the attestation results may be signed by the trusted execution environment 134, and at operation 625 an indicia of the attestation result is output. In some examples the target computing device 110 may provide a visually apparent and offline-verifiable attestation proof of platform security (i.e., health) that can be presented for consumption by an end-user, e.g., by an image capture device. In some examples the attestation proof 480 may be implemented as a visual glyph, QR code, or a signal that is transmissible to a remote device. The attestation proof 480 carries cryptographic proof that the target computing device 110 has performed a self-verification.

At this point the user 140 may verify the attestation proof 480, e.g., by scanning a QR code using a device such as a smartphone. Depending on the type of indicator, the user 140 may be able to obtain an immediate state of the security status (i.e., health) of the target computing device 110, or may be prompted to visit a trusted third party website to prove the indicator 480 is genuine.

In some examples the attestation indicator 480 may be verifiable offline, i.e., verification does not require internet connectivity for either the target computing device 110 or the electronic device 170. In such examples the target computing device 110 has been provisioned with a secret (e.g., an On-Die certificate authority root key and certificate, or an OTP seed, a physically unclonable function (PUF)-derived secret, or the like), and the electronic device 170 has the capacity to verify possession of the secret (i.e., it knows the root certificate authority). Further, at least one of the target computing device 110 or the electronic device 170 knows (or has access to) the expected measurements.

Figure 5B:
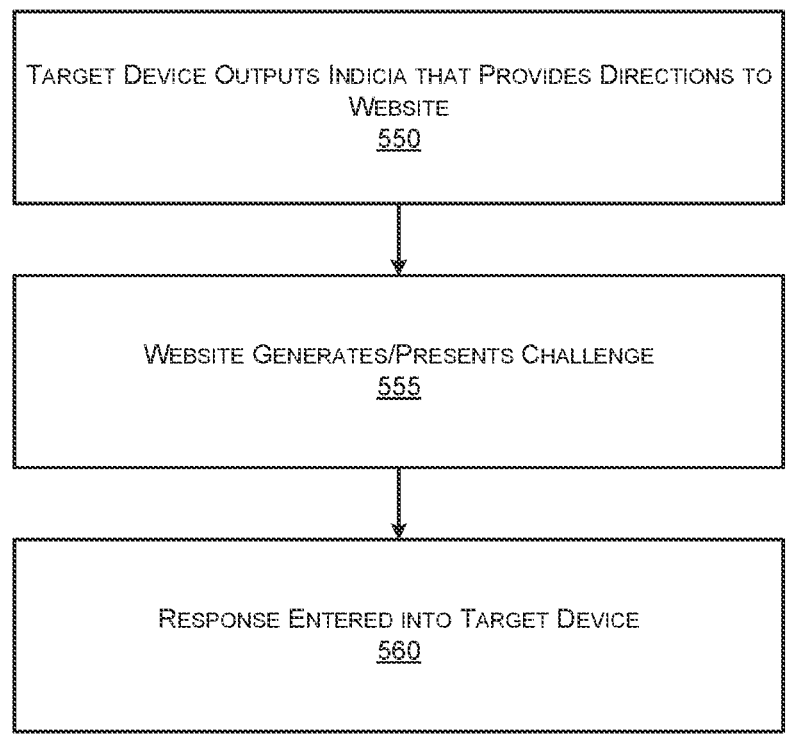
FIG. 5B is a simplified flow diagram of a method for platform health verification according to an embodiment.

FIG. 5B is a simplified flow diagram of at least one embodiment of a method 500 for platform health verification according to an embodiment. In some examples the operations depicted in FIG. 5B may be implemented as an addition to the operations depicted in FIG. 6. Referring to FIG. 5B at operation 550 the target computing device 110 generates and outputs an indicia that provides directions to website 150. In some examples the indicia may include a QR code or other visual indicia that can be scanned by electronic device 170. In further examples the indicia may include a visual presentation of a uniform resource locator (URL) for website 155, which may be entered into electronic device 170 by user 140. In either case, electronic device 170 uses the indicia to establish a communication connection with website 155.

At operation 555 the website 155 generates a random challenge and presents the challenge to electronic device 170. In some examples the random challenge may be a numeric or alphanumeric code that is to be returned by the user 140 of the electronic device 170. At operation 560 the response is entered into the target device 110, e.g., by the user or by the electronic device 170, thereby establishing a trusted communication link between electronic device 170 and website 155.

At this point the operations depicted in FIG. 6 may be implemented to complete the attestation process.

Figure 7A:
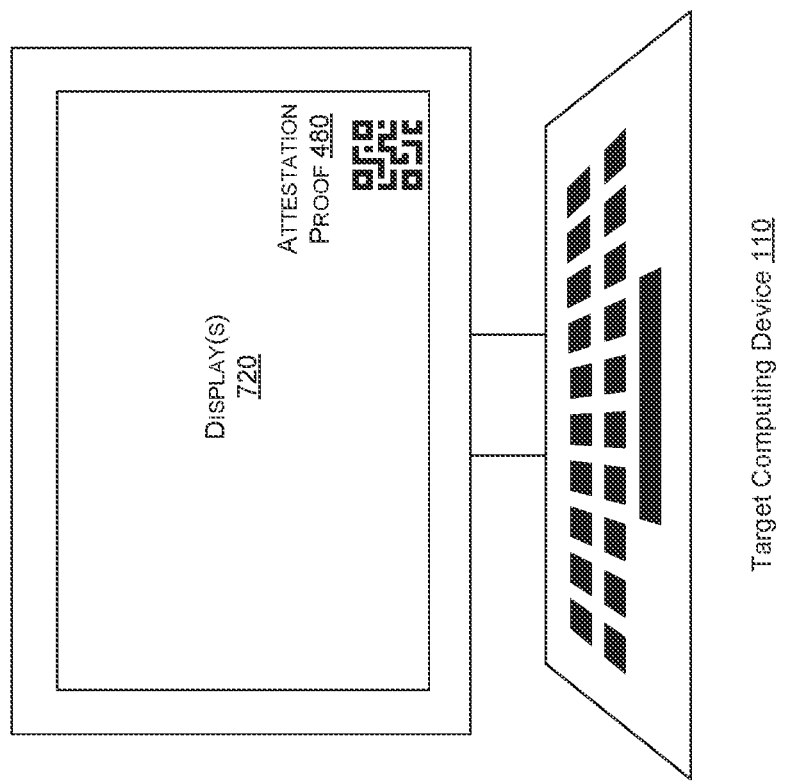
FIG. 7A is a block diagram illustrating a display presenting indicia of platform health verification according to an embodiment.

FIG. 7A is a block diagram illustrating a target computing device 110 having a display 720 presenting indicia 480 of platform security verification according to an embodiment. In the example depicted in FIG. 7A the indicia 480 is in the form of a QR code containing an encoded platform-signed security statement and certificate authority certificate information. In other examples a one-time token (e.g., a numeric token may be implemented), assuming the helper device has been paired with the token generation source. In other examples a visual glyph or physical indication (e.g., a light-emitting diode (LED), a separate display, green keyboard backlight, etc.) that is exclusively controlled by the trusted execution engine 134 and hardware-enforced not to be shown unless attestation is successful. In another example the indicia may be presented by an emitted transmission (e.g., NFC, Bluetooth, BLE, low frequency sound, etc.)

Figure 7B:
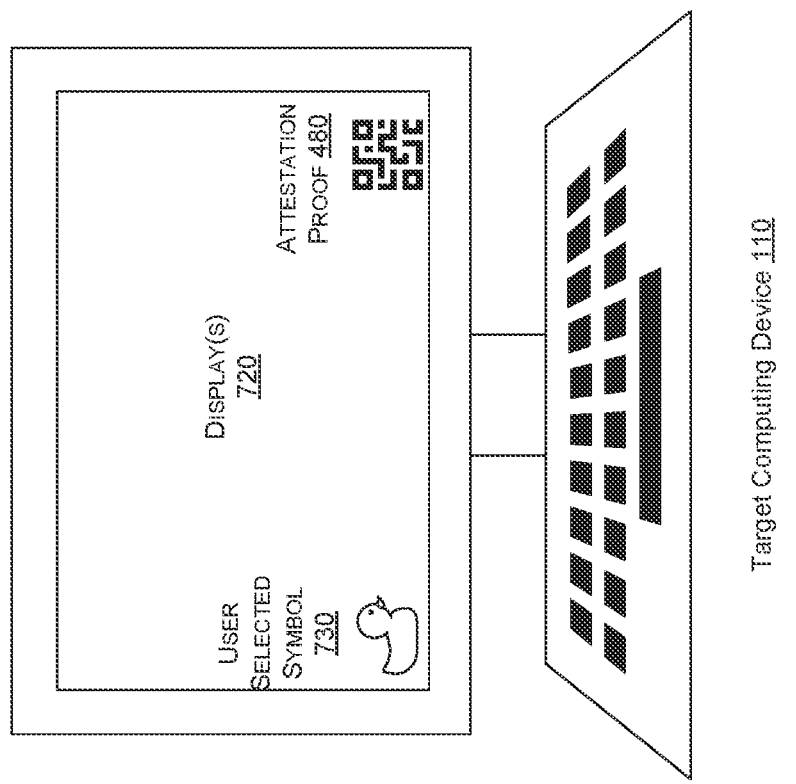
FIG. 7B is a block diagram illustrating a display presenting indicia of platform health verification according to an embodiment.

In some examples these indicators may be troublesome for an end-user to check (i.e., may require a helper device). If the target computing device 110 is already known to the user and the risk of a physical attack is low, the use of an additional indicator allows the user to assess that platform remains intact by displaying a 'familiar' (secret) indication that the user has selected. FIG. 7B is a block diagram illustrating a target computing device 110 having a display 720 presenting indicia 480 of platform security verification according to an embodiment. In the example depicted in FIG. 7B the indicia 480 is in the form of a QR code and the user selected symbol 730 is in the form of a picture or glyph. In other examples the user selected indicator 730 may be in the form of a recorded set of tones, LED blinks, on-screen text, or the like. In some examples the display of the secret and/or familiar indicator may be exclusively controlled by the trusted execution engine 134 and enforced (e.g., by hardware) not to be shown unless self-attestation is successful."

Exemplary Computing Architecture

Figure 8:
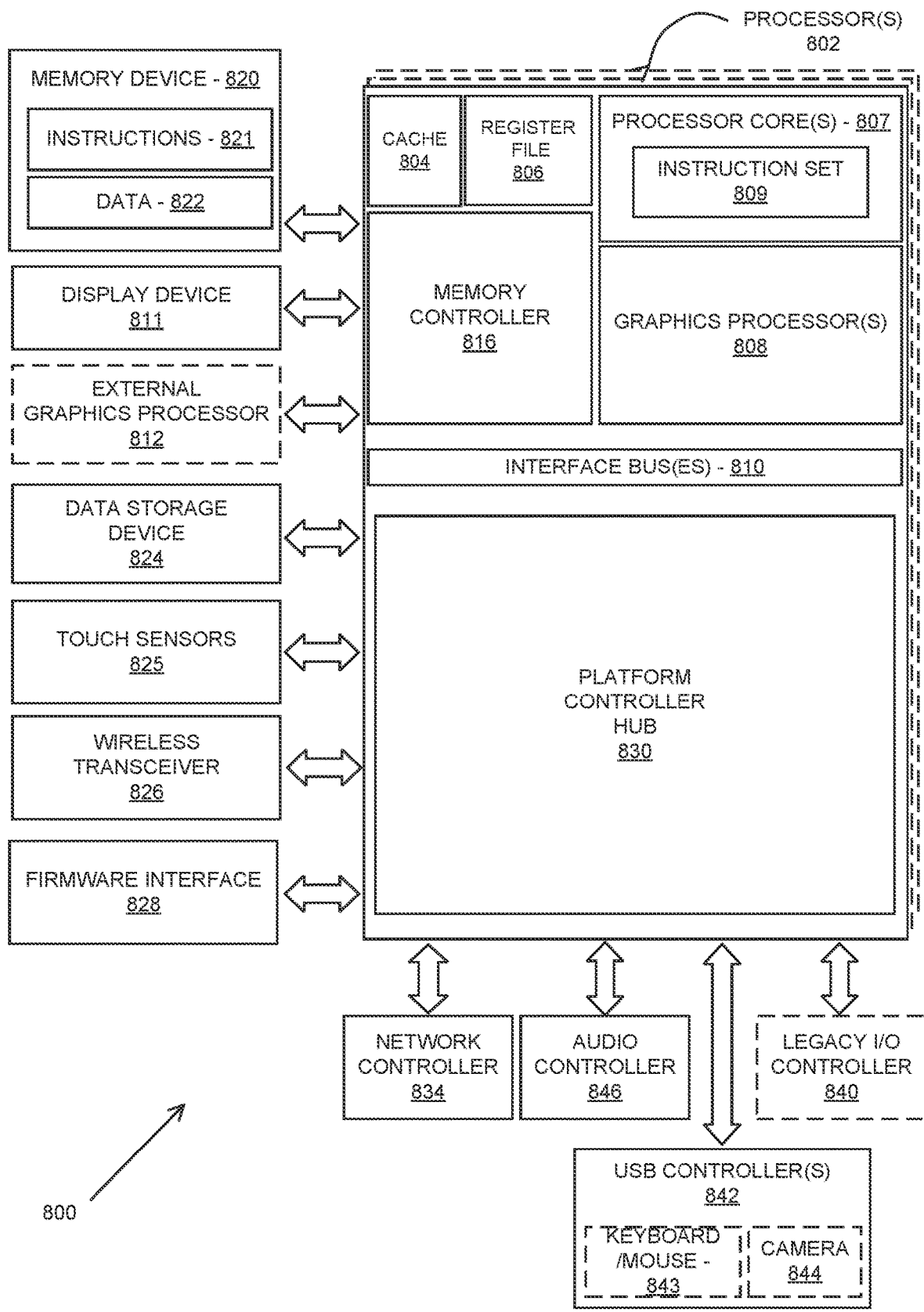
FIG. 8 is a block diagram illustrating a computing architecture which may be adapted to provide a method for platform health verification according to an embodiment.

FIG. 8 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 800 may comprise or be implemented as part of an electronic device. In some embodiments, the computing architecture 800 may be representative, for example, of a computer system that implements one or more components of the operating environments described above. In some embodiments, computing architecture 800 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within, a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 814. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such as a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the system. The interface bus 810, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 802 include an integrated memory controller 816 and a platform controller hub 830. The memory controller 816 facilitates communication between a memory device and other components of the system 800, while the platform controller hub (PCH) 830 provides connections to I/O devices via a local I/O bus.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 execute an application or process. Memory controller hub 816 also couples with an optional external graphics processor 812, which may communicate with the one or more graphics processors 808 in processors 802 to perform graphics and media operations. In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., hard disk drive, flash memory, etc.). The data storage device 824 can connect via a storage interface (e.g., SATA) or via a peripheral bus, such as a Peripheral Component Interconnect bus (e.g., PCI, PCI Express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, Long Term Evolution (LTE), or 5G transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high definition audio controller. In one embodiment the system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is method comprising issuing a challenge to a target computing device; receiving, from the target computing device, a response to the challenge, the response comprising a self-attestation proof, a root of trust (RoT) certificate, and a set of current attestation measurements; and generating a signal indicative of a security status of the target based upon a determination of whether the set of current attestation measurements match a set of expected attestation measurements for the target computing device.

Example 2 includes the subject matter of Example 1, further comprising establishing an out-of-band (OOB) communication channel with the target computing device.

Example 3 includes the subject matter of Examples 1-2, further comprising presenting the signal indicative of the security status of the target computing device on a user interface.

Example 4 includes the subject matter of Examples 1-3, wherein the signal indicative of the security status of the target computing device on a user interface comprises at least one of a visual indicator presented on a display; an audible indicator; or a tactile indicator.

Example 5 includes the subject matter of Examples 1-4, further comprising obtaining, from a trusted third party, the set of expected attestation measurements for the target computing device.

Example 6 includes the subject matter of Examples 1-5, further comprising transmitting the security status of the target computing device to the trusted third party.

Example 7 includes the subject matter of Examples 1-6 further comprising storing the security status of the target computing device in a computer-readable memory.

Example 8 is an apparatus, comprising a processor; and a computer readable memory comprising instructions which, when executed by the processor, cause the processor to issue a challenge to a target computing device; receive, from the target computing device, a response to the challenge, the response comprising a self-attestation proof, a root of trust (RoT) certificate, and a set of current attestation measurements; and generate a signal indicative of a security status of the target based upon a determination of whether the set of current attestation measurements match a set of expected attestation measurements for the target computing device.

Example 9 includes the subject matter of Example 8, the processor to establish an out-of-band (OOB) communication channel with the target computing device.

Example 10 includes the subject matter of Examples 8-9, the processor to present the signal indicative of the security status of the target computing device on a user interface.

Example 11 includes the subject matter of Examples 8-10, wherein the signal indicative of the security status of the target computing device on a user interface comprises at least one of a visual indicator presented on a display; an audible indicator; or a tactile indicator.

Example 12 includes the subject matter of Examples 8-11, further comprising instructions which, when executed by the processor, cause the processor to obtain, from a trusted third party, the set of expected attestation measurements for the target computing device.

Example 13 includes the subject matter of Examples 8-12, the computer readable memory comprising instructions which, when executed by the processor, cause the processor to transmit the security status of the target computing device to the trusted third party.

Example 14 includes the subject matter of Examples 8-13, the computer readable memory comprising instructions which, when executed by the processor, cause the processor to store the security status of the target computing device in a computer-readable memory.

Example 15 is one or more computer-readable storage media comprising instructions stored thereon that, in response to being executed, cause a computing device to issue a challenge to a target computing device; receive, from the target computing device, a response to the challenge, the response comprising a self-attestation proof, a root of trust (RoT) certificate, and a set of current attestation measurements; and generate a signal indicative of a security status of the target based upon a determination of whether the set of current attestation measurements match a set of expected attestation measurements for the target computing device.

Example 16 includes the subject matter of Examples 13-15, further comprising instructions stored thereon that, in response to being executed, cause the computing device to establish an out-of-band (OOB) communication channel with the target computing device.

Example 17 includes the subject matter of Examples 15-16, further comprising instructions stored thereon that, in response to being executed, cause the computing device to present the signal indicative of the security status of the target computing device on a user interface.

Example 18 includes the subject matter of Examples 15-17, wherein the signal indicative of the security status of the target computing device on a user interface comprises at least one of a visual indicator presented on a display; an audible indicator; or a tactile indicator.

Example 19 includes the subject matter of Examples 15-18, further comprising instructions stored thereon that, in response to being executed, cause the computing device to obtain, from a trusted third party, the set of expected attestation measurements for the target computing device.

Example 20 includes the subject matter of Examples 15-19, further comprising instructions stored thereon that, in response to being executed, cause the computing device to transmitting the security status of the target computing device to the trusted third party.

Example 21 includes the subject matter of Examples 15-20, further comprising instructions stored thereon that, in response to being executed, cause the computing device to store the security status of the target computing device in a computer-readable memory.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A method comprising:
   issuing, by a computing device, a challenge to a target computing device;
   receiving, from the target computing device, a response to the challenge, the response comprising one or more of a self-attestation proof, a root of trust certificate, or a set of current attestation measurements; and
   generating a signal indicative of a security status relating to the target computing device based on whether the set of current attestation measurements matches a set of expected attestation measurements associated with the target computing device, wherein the signal indicative of the security status is presented via an interface associated with the target computing device, wherein the expected attestation measurements are associated with the target computing device and obtained based on an appraisal of the target computing device in an isolated environment such that sensitive information is secured prior to interaction with the target computing device.

2. The method of claim 1, further comprising:
   establishing an out-of-band (OOB) communication channel with the target computing device, wherein the signal comprises one or more of a visual indicator presented on a display; an audible indicator; or a tactile indicator;
   obtaining, from a trusted third party, the set of expected attestation measurements associated with the target computing device;
   transmitting the security status relating to the target computing device to the trusted third party; and
   storing the security status relating to the target computing device.

3. The method of claim 1, wherein the computing device comprises a processor including an application processor or a graphics processor.

4. A computing device comprising:
   processor circuitry coupled to a memory, the processor circuitry to:
   issue a challenge to a target computing device;
   receive, from the target computing device, a response to the challenge, the response comprising one or more of a self-attestation proof, a root of trust certificate, or a set of current attestation measurements; and
   generate a signal indicative of a security status relating to the target computing device based on whether the set of current attestation measurements matches a set of expected attestation measurements associated with the target computing device, wherein the signal indicative of the security status is presented via an interface associated with the target computing device, wherein the expected attestation measurements are associated with the target computing device and obtained based on an appraisal of the target computing device in an isolated environment such that sensitive information is secured prior to interaction with the target computing device.

5. The computing device of claim 4, wherein the processor circuitry is further to:
   establish an out-of-band (OOB) communication channel with the target computing device, wherein the signal comprises one or more of a visual indicator presented on a display; an audible indicator; or a tactile indicator;
   obtain, from a trusted third party, the set of expected attestation measurements associated with the target computing device
   transmit the security status relating to the target computing device to the trusted third party; and
   store the security status relating to the target computing device.

6. The computing device of claim 4, wherein the processor circuitry comprises application processor circuitry or graphics processor circuitry.

7. At least one non-transitory computer-readable medium having stored thereon instructions which, when executed, cause a computing device to perform operations comprising:
   issuing a challenge to a target computing device;
   receiving, from the target computing device, a response to the challenge, the response comprising one or more of a self-attestation proof, a root of trust certificate, or a set of current attestation measurements; and
   generating a signal indicative of a security status relating to the target based on whether the set of current attestation measurements matches a set of expected attestation measurements associated with the target computing device, wherein the signal indicative of the security status is presented via an interface associated with the target computing device, wherein the expected attestation measurements are associated with the target computing device and obtained based on an appraisal of the target computing device in an isolated environment such that sensitive information is secured prior to interaction with the target computing device.

8. The non-transitory computer-readable medium of claim 7, wherein the operations further comprise:
- establishing an out-of-band (OOB) communication channel with the target computing device, wherein the signal comprises one or more of a visual indicator presented on a display; an audible indicator; or a tactile indicator;
- obtaining, from a trusted third party, the set of expected attestation measurements for the target computing device;
- transmitting the security status relating to the target computing device to the trusted third party; and
- storing the security status relating to the target computing device.

9. The computer-readable medium of claim 7, wherein the computing device comprises one or more processors including one or more application processors or one or more graphics processors.

* * * * *